US007546261B2

(12) United States Patent
Bogosian et al.

(10) Patent No.: US 7,546,261 B2
(45) Date of Patent: *Jun. 9, 2009

(54) EXTRACTION OF BANK ROUTING NUMBER FROM INFORMATION ENTERED BY A USER

(75) Inventors: Matthew T. Bogosian, Seattle, WA (US); Nicholas K. Peddy, Bellevue, WA (US); FuMing Young, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 503 days.

This patent is subject to a terminal disclaimer.

(21) Appl. No.: 10/884,360

(22) Filed: Jul. 2, 2004

(65) Prior Publication Data
US 2004/0236690 A1 Nov. 25, 2004

Related U.S. Application Data

(63) Continuation of application No. 09/517,563, filed on Mar. 2, 2000, now Pat. No. 6,760,470.

(60) Provisional application No. 60/156,231, filed on Sep. 27, 1999.

(51) Int. Cl.
*G06Q 40/00* (2006.01)
(52) U.S. Cl. .............................. 705/35; 705/1; 705/16; 705/17; 705/21; 705/26; 705/39; 705/40; 705/42; 705/44; 705/45; 705/53
(58) Field of Classification Search .................... 705/35, 705/1, 16, 17, 21, 26, 39, 40, 42, 44, 45, 705/53
See application file for complete search history.

(56) References Cited

U.S. PATENT DOCUMENTS 4,321,672 A    3/1982   Braum et al.

(Continued)

OTHER PUBLICATIONS eToys Website http://web.archive.org/web/19990503113623/www1.etoys.com/html/et_home.shtml.*

(Continued)

*Primary Examiner*—Kambiz Abdi
*Assistant Examiner*—Shahid R Merchant
(74) *Attorney, Agent, or Firm*—Knobbe, Martens, Olson & Bear, LLP

(57) ABSTRACT

The present invention provides various features for extracting a user's bank account information for use in facilitating the electronic transfer of funds to or from the user's bank account. One feature of the invention involves a method and system for extracting a bank routing number from character strings provided by a user from the face of a bank check. The method involves receiving from the user a magnetic ink character recognition (MICR) line. A contiguous string of characters within the MICR line that satisfies a checksum test is stored as the bank routing number for the user. A check number and an account number may also be received from the user. A test is performed to verify that the check number, the account number, and the bank routing number all coexist within the MICR line. Another feature of the invention involves a method and system for facilitating the transfer of funds between a buyer and a seller. A bank routing number is determined for the seller as noted above. A credit card account associated with the buyer is then charged to collect funds for purchasing one or more items from the seller, and at least a portion of the collected funds is deposited into the bank account of the seller using the extracted bank routing number.

35 Claims, 12 Drawing Sheets

U.S. PATENT DOCUMENTS

| | | | |
|---|---|---|---|
| 5,237,159 A | | 8/1993 | Stephens et al. |
| 5,602,742 A | * | 2/1997 | Solondz et al. ............. 705/410 |
| 5,781,654 A | * | 7/1998 | Carney ...................... 382/137 |
| 5,826,241 A | * | 10/1998 | Stein et al. .................... 705/26 |
| 5,870,725 A | | 2/1999 | Bellinger et al. |
| 5,890,141 A | | 3/1999 | Carney et al. |
| 5,940,844 A | | 8/1999 | Cahill et al. |
| 5,991,749 A | * | 11/1999 | Morrill, Jr. ................... 705/44 |
| 6,006,208 A | * | 12/1999 | Forst et al. ................... 705/39 |
| 6,123,260 A | | 9/2000 | Menzenski |
| 6,164,528 A | | 12/2000 | Hills et al. ................. 235/379 |
| 6,181,814 B1 | | 1/2001 | Carney |
| 6,269,343 B1 | * | 7/2001 | Pallakoff ..................... 705/26 |
| 6,377,935 B1 | | 4/2002 | Deaton et al. |
| 6,401,079 B1 | * | 6/2002 | Kahn et al. ................... 705/30 |
| 7,177,836 B1 | * | 2/2007 | German et al. ................ 705/40 |

OTHER PUBLICATIONS

Faststart Direct Deposit, Form 11-92. http://web.archive.org/web/19980530012159/www.fms.treas.gov/eft/2231.pdf.*

1998 Direct Deposit of Refund, Form 3174 http://web.archive.org/web/19990508162658/www.treas.state.mi.us/formspub/forms/indtax/1998/m3174f8.pdf.*

Thomson Financial Services Expands Financial Offerings on the Web by Barbara Quint, http://newsbreaks.infotoday/nbReader.asp?ArticelId=18720, May 21, 1998.* eToys Website http://web.archive.org/web/19990503113623/www1.etoys.com/html/et_home.shtml, 1999.*

Faststart Direct Deposit, Form 11-92. http://web.archive.org/web/19980530012159/www.fms.treas.gov/eft/2231.pdf, 1998.*

1998 Direct Deposit of Refund, Form 3174 http://web.archive.org/web/19990508162658/www.treas.state.mi.us/formspub/forms/indtax/1998/m3174f8.pdf, 1999.*

* cited by examiner

*FIG. 4*

| | | |
|---|---|---|
| Amazon.com:/Electronics & Photography – Microsoft Internet Explorer | | |

Address: http://s1.amazon.com/exec/varzea/search-handle-form/102-1788364-5984843

Featured zShop Listings

Sort listings by: Start date: new to old

| | 1-Click Payment | zShop Title | Price |
|---|---|---|---|
| | | World's Fastest PC-133 128MB 7ns SDRAM tested to 150 MHz Lifetime Warranty! | $199.80 |
| | ✓ | BRINK'S DIGITAL FIRE SAFE, MODEL 5054D | $145.95 |
| | | Faces of Freedom 3D Virtual WWII Submariners Museum | $19.95 |
| | ✓ | Web Site Hosting only $60.00 for six months! | $60.00 |
| | | Cambridge SoundWorks Model Six Bookshelf Speakers (Teak) | $249.99 |
| | ✓ | Speak Naturally and it TYPES @ 150 WPM – VOICE PILOT 3.0 | $15.99 |
| | | NEW! PII 400,64MB,Intel MB,52x CDROM,VD 6.4G Video,56K modem | $800.00 |
| | ✓ | SafiBook Reader™ – Award-winning eBook Device (8 MB without content commitment) | $599.95 |
| | | Chris DVR160 Digital Voice Recorder – Fast Easy! 60 Minutes Super value | $59.95 |

FIG. 11

EXTRACTION OF BANK ROUTING NUMBER FROM INFORMATION ENTERED BY A USER

RELATED APPLICATIONS

This application is a continuation of U.S. application Ser. No. 09/517,563, filed Mar. 2, 2000 now U.S. Pat No. 6760470, the entirety of which is hereby incorporated by reference, and further claims the benefit of U.S. Provisional Application No. 60/156,231, filed Sep. 27, 1999, the disclosure of which is hereby incorporated by reference.

FIELD OF THE INVENTION

The present invention relates to the field of electronic commerce. More specifically, the invention relates to techniques for facilitating the transfer of electronic funds.

BACKGROUND OF THE INVENTION

In the field of electronic commerce it is common for online merchants to sell products advertised on web sites. Such merchants generally require payment from a buyer in the form of a bank credit card charge. Thus, to complete an online transaction the buyer normally needs to enter information (i.e., a card-holder name, a credit card number, and an expiration date) associated with a bank credit card. This approach requires the online merchant to have the capacity to process credit card payments.

It is now common for relatively unsophisticated sellers to market products online. Many such sellers lack the ability to receive credit card orders. Instead, they depend primarily upon the traditional payment means of personal checks and money orders.

One approach for unsophisticated sellers that is becoming increasingly popular is to advertise and sell their wares on a sophisticated commercial web site that provides a forum for third party sellers. For example, Amazon.com, Inc., the assignee of the present application, hosts two such forums: "Amazon.com Auctions," in which third party sellers auction off products to buyers, and "zShops," in which third party sellers advertise fixed-price products to buyers. Such third party transactions generally proceed as follows. A seller posts to the host web site information regarding a product it wishes to sell. A buyer with an interest in the product submits a purchase offer to the host web site. If there is mutual interest in the transaction, the host web site informs each party of the deal. The buyer and seller then arrange on their own how the buyer will pay the purchase price and how the seller will provide the product.

Since the parties must deal with one another in arranging payment and delivery, there immediately arises the problem of trust. Whereas the host web site may be a large well known entity with a reputation to protect, the individual buyers and sellers in these third party transactions are generally unknown to the other party. The buyer will not feel confident about the transaction until he or she receives the product and can inspect it for comparison with expectations. The seller will not feel confident about the transaction until he or she receives the proper payment and, if necessary, converts it into a cash-equivalent form. Typically this means the seller must wait for several days, at least, until a money order, cashier's check, or cleared personal check is in hand.

Furthermore, the seller has no way of knowing whether the buyer is ever going to pay. The buyer may have a change of heart, never to be heard from again. During the week or ten days (or more) that it takes the seller to realize that the buyer has backed out, the seller may miss opportunities to sell the product to other buyers.

Also, payment via a personal check through the mail generally requires a seller to identify his or her name to the buyer. This may be unacceptable to sellers who prefer to remain anonymous to the buying public. Payment to a seller via a credit card requires a buyer to identify his credit card information to the seller. This may be unacceptable to buyers who prefer to limit the exposure of their credit card numbers to trusted commercial entities.

The present invention seeks to overcome these and other problems.

SUMMARY OF THE INVENTION

The present invention provides various methods for extracting a user's bank account information for use in facilitating the electronic transfer of funds to or from the user's bank account. The methods may be used, for example, as an alternative to requiring users to send a voided check to the entity initiating the transfer. The methods may be embodied within a web site, an online services network, a telephone-based voice prompting system, or another type of interactive system that can be accessed by remote users. The invention also provides various associated methods for facilitating transfers of funds between a buyer and a seller in an online system for users to sell items to other users.

One feature of the invention involves a method and system for extracting a bank routing number from character strings entered by a user from the face of a bank check. In a preferred embodiment, the method involves receiving from the user the character string of a magnetic ink character recognition (MICR) line. The user may optionally be prompted to provide the MICR line with the assistance of a generalized image of a check indicating the location of the MICR line on the face of the check. A checksum test is then applied to a contiguous string of characters within the MICR line. A contiguous string that satisfies the checksum test is identified and stored as the bank routing number for the user.

The user may also be prompted to enter a check number and an account number from the check, which may likewise be obtained with the assistance of a generalized image of a check indicating the locations of such numbers. In this case, a test is preferably performed to verify that the check number, the account number, and the bank routing number all coexist within the MICR line. If coexistence is verified, the account number and bank routing number are stored for later use in facilitating payments to the user. The user may also optionally be prompted to specify the name of his or her bank, and the specified bank name may be used to verify or to disambiguate the results of the routing number extraction process.

Another feature of the invention involves a method and system for facilitating the transfer of funds between a buyer and a seller in an online auction system, an online flea market system, or another type of system in which user can sell items to other users. In a preferred embodiment, the seller is prompted to enter information from the face of a bank check issued from the seller's bank account. This information is used to determine a bank routing number and account number for the seller. A credit card account associated with the buyer is then charged to collect funds for purchasing one or more items from the seller, and at least a portion of the collected funds is deposited electronically into the seller's bank account using the bank routing number and account number. In one embodiment, an indication is displayed in association with the seller's product offering(s) informing buyers that the seller is enabled to accept payment electronically. Preferably, buyers are given the option to immediately purchase items from such sellers using a default credit card number and shipping address previously specified by the buyer.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that provides some of the disclosed advantages but not others.

BRIEF DESCRIPTION OF THE FIGURES

These and other features and advantages of the invention will now be described with reference to the drawings of certain preferred embodiments, which are intended to illustrate and not to limit the invention, and in which:

FIG. 4 illustrates the second of two sample pages used to receive check information from a seller.

FIG. 11 illustrates a sample product listing page displayed when a prospective buyer browses the host web site for products offered for sale by third party sellers. Each product listed on the listing page has an associated purchase page like the one illustrated in FIG. 10.

DETAILED DESCRIPTION OF THE PREFERRED EMBODIMENT

The present invention provides various methods for determining the routing and transit number ("routing number") for a user's bank, and the user's checking account number at that bank, using information read from a check and entered by the user. The methods may be implemented within an interactive computer system that provides a service for users to transfer funds to other users. Examples of such systems are described in U.S. patent application Ser. Nos. 09/312,028 and 09/312,309 both filed on May 14, 1999, the disclosures of which are hereby incorporated by reference. The transfers may be in support of online purchasers, debt settlements, commissions, gifts, charitable donations, bill payments, etc. In a preferred embodiment, the methods are implemented by an online merchant or other business entity that provides an online forum for users to sell items to other users, such as through online auctions or fixed price sales.

Preferred embodiments and implementations of the invention will now be described with reference to the drawings. The description will reference various details of the invention in the context of Amazon.com's web site. These details are set forth in order to illustrate and not to limit the invention. For example, although the process for determining the bank routing number is described in the context of a system in which users enter text strings into a computer, the same process can be implemented using a telephone-based voice prompting system in which users enter data on a telephone keypad or through voice commands. Accordingly, the scope of the invention is defined only by the appended claims.

Throughout the description, it may be assumed that actions described as being performed by Amazon.com, or by the web site operator, are performed automatically by executable components of the web site system.

Figure 1:
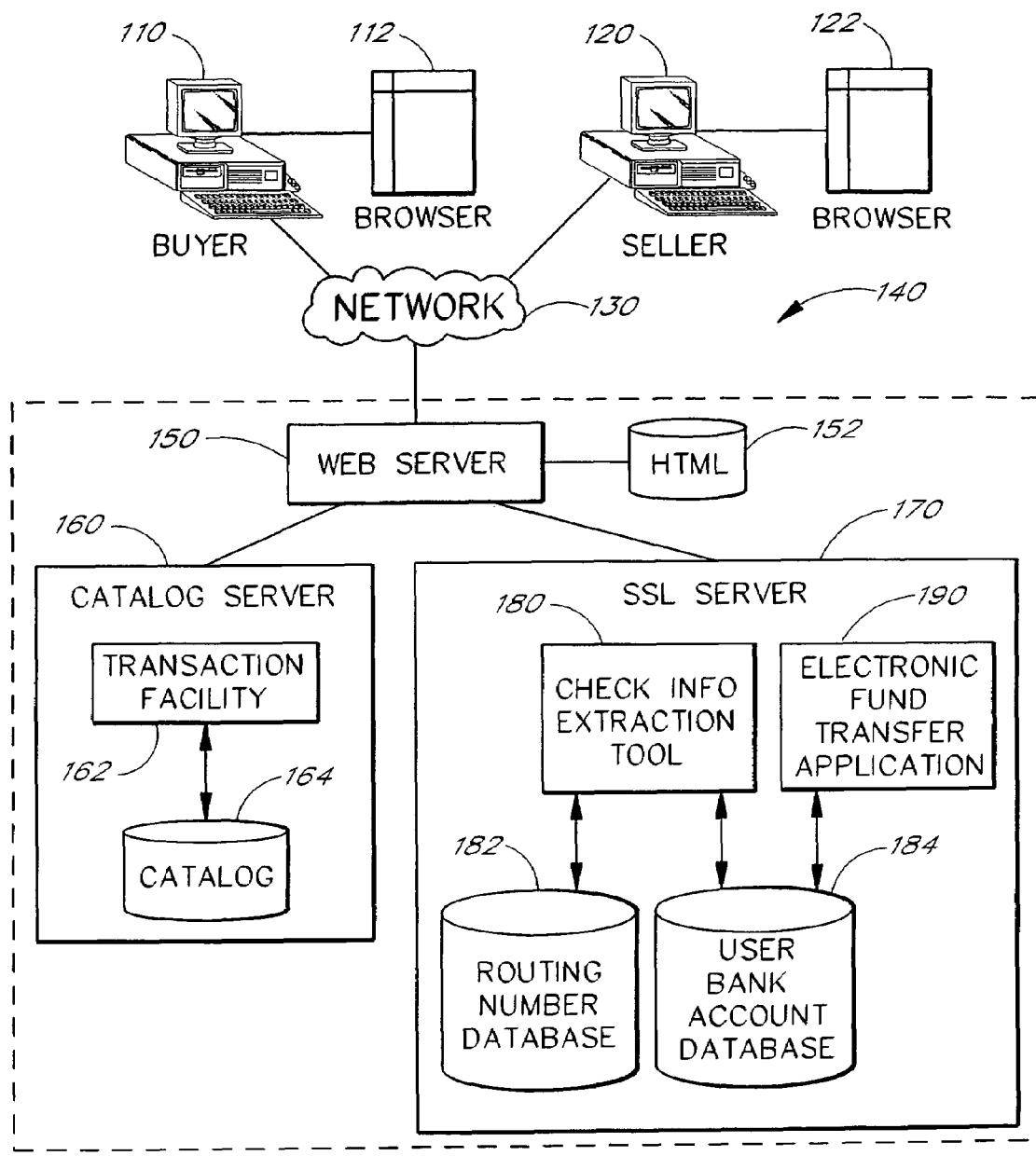
FIG. 1 illustrates a system in which buyers and sellers access web site information via the Internet, and illustrates the basic web site components used to implement a method of extracting check bank numbers that operates in accordance with the present invention.

FIG. 1 illustrates a host web site system 140 ("web site") including components used to implement routing number extraction according to the present invention. As shown in FIG. 1, the host web site 140 includes a web server application 150 ("web server") that processes user requests received from user computers 110 and 120 via a network 130, such as the Internet. The host web site 140 includes a database 152 of HTML (hypertext markup language) content that includes among other things, product information pages that show and describe products associated with the host web site 140.

The host web site 140 includes a catalog server 160 that provides a forum for third party sellers to advertise and sell products. The catalog server 160 includes a transaction facility 162 that receives purchase requests from buyers, and a catalog database 164 containing information about the third party sellers and their associated products. The sales handled by the catalog server 160 may be via auctions, via fixed-price marketplaces (i.e., online "flea markets"), or via any other method using third party sellers.

The host web site 140 further includes a secure sockets layer (SSL) server 170 designed to be secure from outside influences. The SSL server 170 includes a check information extraction tool 180 (discussed in detail below) that determines bank routing numbers for third party sellers selling products on the host web site 140. The check information extraction tool 180 communicates with a user bank account database 184 that contains the bank routing and account numbers for third party sellers selling products on the host web site 140. The check information extraction tool 180 optionally also communicates with a bank routing number database 182 that stores bank routing numbers. The bank routing number database 182 may be a local database, or may be a remote database that is accessed over a secure connection.

The SSL server 170 further includes an electronic fund transfer application 190 that electronically transfers funds into the bank accounts of sellers following completed transactions identified by the transaction facility 162.

The web server 150, catalog server 160 and SSL server 170 and database software preferably run on one or more UNIX-based servers and workstations (not shown) of the web site 140, although other platforms could be used. To accommodate a large number of users, the servers and databases may be replicated across multiple machines.

Consider a seller accessing the host web site 140 with a web browser 122, such as Netscape Communicator, loaded on a remote computer 120 connected to the network 130. Further consider that the seller wants to advertise and sell one or more products or other items on the host web site 140. The seller first registers with the host web site 140 as a third party seller. As part of this process, the seller has the option to register online to use Amazon.com Payments™, which is a service provided by the web site operator for collecting payment from buyers and electronically depositing the resulting funds into the seller's bank checking account. As part of the Amazon.com Payments registration process, the web site 140 determines the seller's bank checking account information, including the bank's routing number, used for electronic funds transfers. A preferred process for determining such information is described below.

Following registration, the seller can post to the web site 140 information about items that are for sale. In the Amazon.com implementation, the seller can select between an Auctions option and a zShops (fixed price) option when posting an item for sale. If the user has registered to use Amazon.com Payments, the posted items are preferably displayed on the web site together with a "1-Click Ready" slogan or an associated icon to indicate to buyers that the seller accepts Amazon.com Payments, and that such payments can optionally be made using the site's 1-Click™ service (see FIGS. 10 and 12). A preferred embodiment of the 1-Click service is set forth in U.S. Pat. No. 5,960,411, which is hereby incorporated by reference. For sellers that are not registered with the Amazon.com Payments service, the buyer and seller must normally contact each other to arrange for payment. For purposes of the remaining description, it may be assumed that the seller has registered to use Amazon.com Payments.

Next consider a buyer accessing the host web site 140 with a web browser 112 loaded on a remote computer 110 connected to the network 130. Further consider that the buyer browses a third party vendor forum (e.g., Auctions or zShops) of the host web site 140, reads about a product offered for sale by the seller, and decides to purchase or submit a bid for the product. Once the buyer selects the item for purchase or wins an auction for the item, the transaction facility 162 obtains the buyer's credit card and shipping information. If the buyer has set up and enabled 1-Click settings, the credit card and shipping information are extracted automatically from such settings; otherwise, the buyer is preferably prompted to specify the information. The transaction facility 162 then charges the buyer's credit card and calculates a commission to be retained by the web site operator. In addition, the transaction facility 162 forwards the transaction information to the electronic fund transfer application 190, which deposits the purchase price amount (minus the commission) into the seller's bank checking account. Finally, the transaction facility 162 instructs the seller by email to ship the product to the buyer.

A process for determining a bank routing number from the numbers inscribed on a bank check will now be described with the help of FIG. 2. In a starting state 200, the host web site 140 receives a request from a user to register to use Amazon.com Payments. Proceeding to states 210, 212, and 214, the host web site 140 receives from the seller a magnetic ink character recognition (MICR) line, a bank check number, and a bank account number, respectively. All three numbers are identifiable on the face of a bank check. The MICR line is over twenty characters long, contains special symbols in addition to digits and is typically found along the bottom border of bank checks. The check number is typically about three to five digits long and is found in the upper right hand corner of a bank check and also in the MICR line. The bank account number is typically about eight to ten digits long and is found within the digits of the MICR line. The number entering states 210, 212, and 214 may occur in any order. Furthermore, in one embodiment, one or both of the check and account numbers is not received until after the determination of candidate routing numbers (state 220, discussed below).

Figure 3:
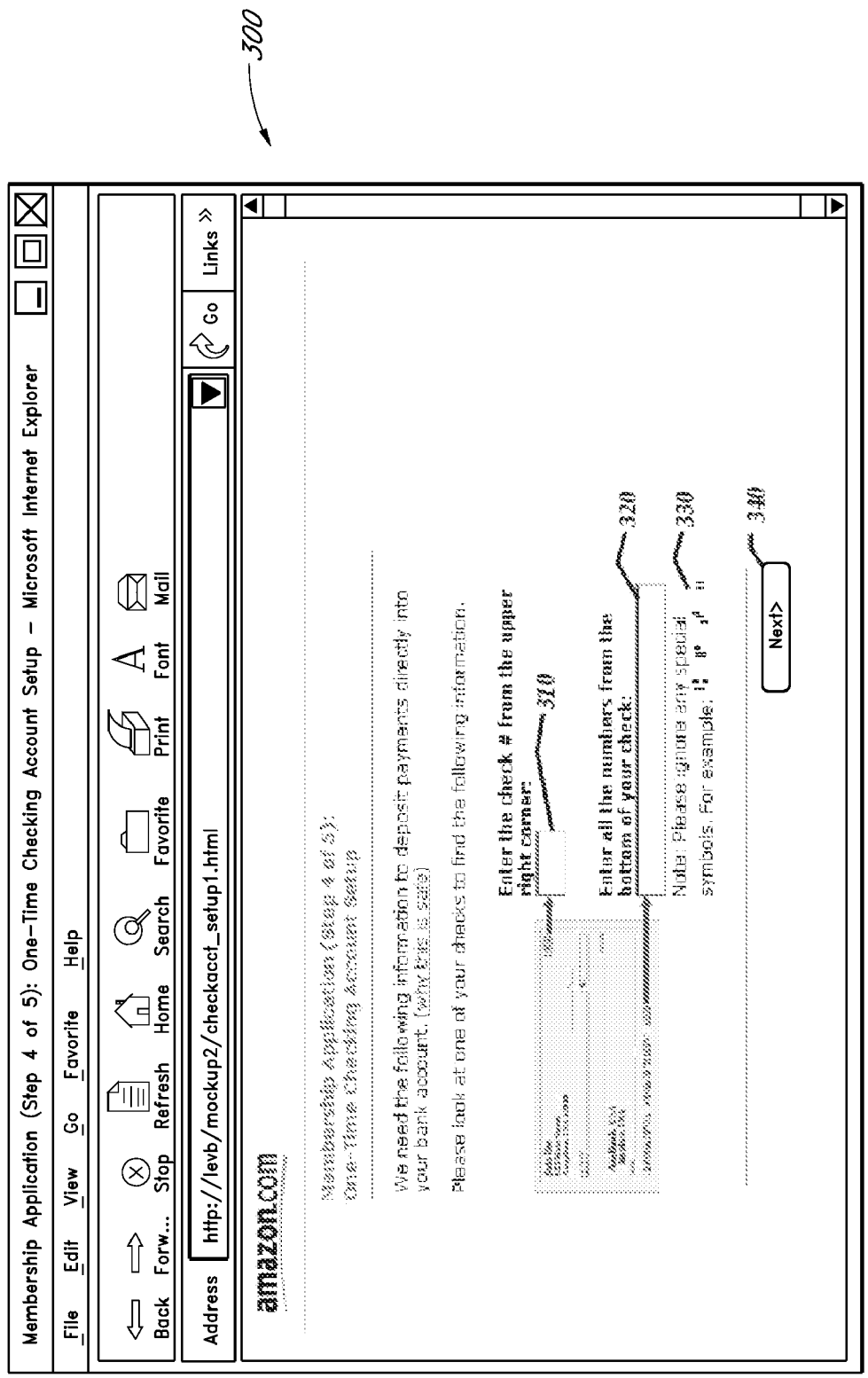
FIG. 3 illustrates the first of two sample pages used to receive check information from a seller.

FIG. 3 illustrates a first number entry page 300 that facilitates receiving a MICR line and bank account number from a user. The web page 300 includes a check number field 310 for entering a bank check number and a MICR line field 320 for entering a bank MICR line. In a preferred embodiment, the user is assisted in identifying these numbers with descriptions and pictures 330, including a generalized image of a check. The web page 300 further includes a first Next button 340. Selection of the first Next button 340 transmits the check number and MICR line entered in the respective fields 310, 320 to the host web site 140 and loads a second number entry page 400 for the user.

Figure 4:
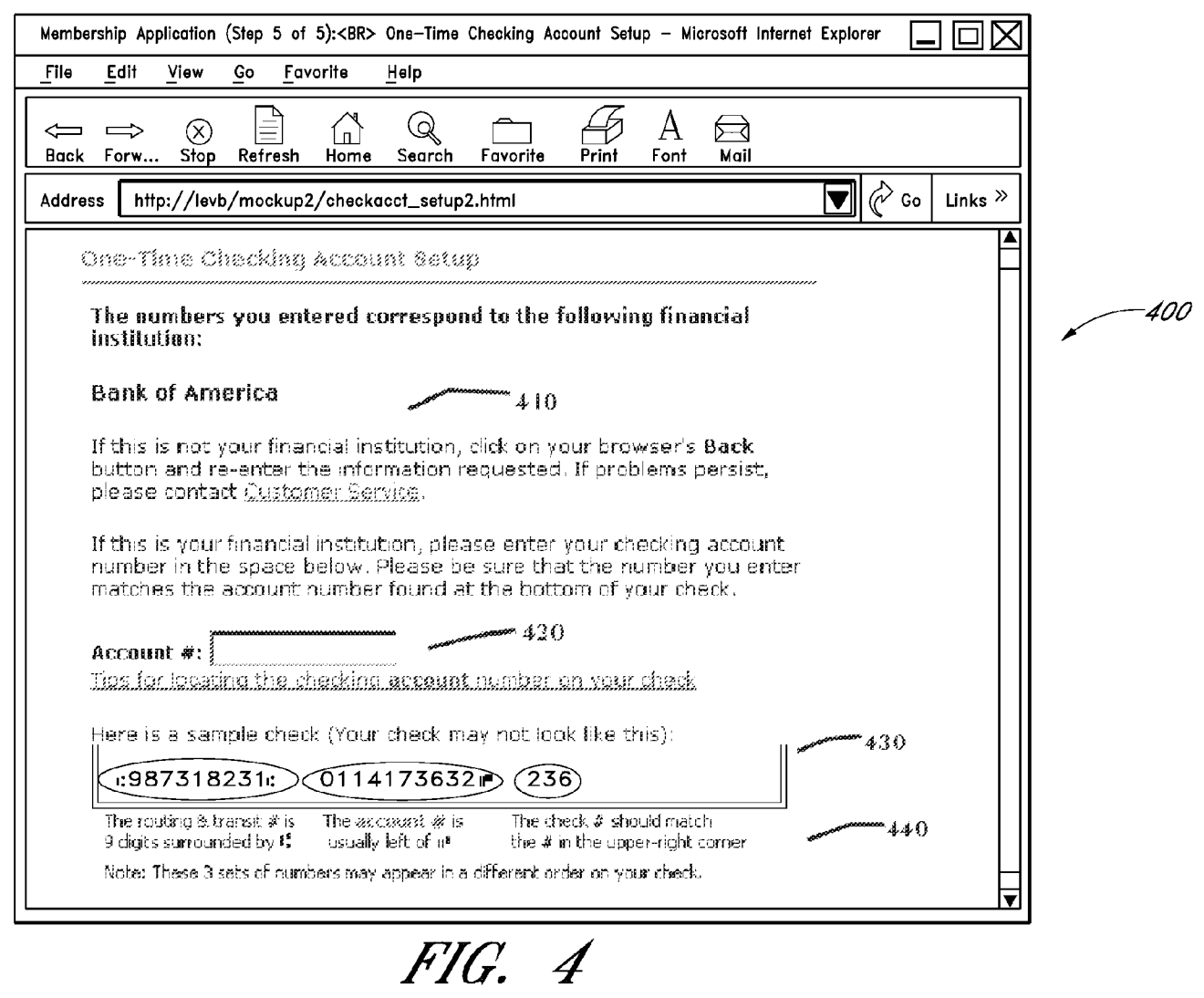

FIG. 4 illustrates the second number entry page 400, including a message requesting that the user enter an account number 415, and a field 420 for entering a bank account number. In a preferred embodiment, the user is assisted in identifying the account number with descriptions and pictures 430. In one embodiment, the user is provided with the name of a banking institution determined from the information entered on the first number entry page 300. The second number entry page 400 further includes a second Next button 440. Selection of the second Next button 440 transmits the account number entered in the account number field 420 to the host web site 140 and loads a new web page for the user.

Although FIGS. 3 and 4 depict a method of receiving the MICR line, check number, and account number through a web page, any method may be used. For example, the user may provide the numbers using a telephone either by speaking the numbers or by entering the numbers on the telephone number pad.

Referring back to FIG. 2, upon receiving the MICR line, check number and account number, the host web site 140 proceeds to state 220, where a set of candidate bank routing numbers is determined. Banking institutions identify themselves within the banking community through nine-digit routing numbers. Each routing number uniquely identifies a particular banking entity. A bank check includes within its MICR line the routing number corresponding to the bank that issued the check. Other banks, upon receipt of a bank check, identify the bank that issued the check by determining the routing number within the MICR line. For efficiency reasons, the MICR line on a check is encoded with magnetic ink that facilitates machine reading of the digits. Banks usually extract the MICR line information in this manner.

Several factors complicate the identification of the bank routing number from within the MICR line. First, the MICR line includes an account number and a check number in addition to the routing number. Second, banks are not consistent in the order with which they present these three numbers. Third, some banks include other digits in the MICR line in addition to the three numbers discussed above.

The reliability of reading MICR lines is improved by using a "checksum test." A checksum test, generally, is a technique for verifying the validity of a string of digits through the use of a predetermined algorithm. Such a test is commonly done when communicating digit strings in order to catch errors that may be introduced during input, output, or transmission of the data. In a checksum test, the sender selects the digit string so that the predetermined algorithm generates an expected result when applied to the individual digits of the string. The algorithm, for example, could add the first digit to twice the second digit, subtract three times the third digit, and so on.

The expected result, for example, could be that the algorithm output is divisible by ten. A receiver, upon receiving the data, may then verify that the predetermined algorithm generates the expected result when applied to the received digit string. If the algorithm creates an unexpected result, the receiver knows that the data string contains errors.

Each bank routing number is created to satisfy such a checksum test. The predetermined algorithm used for this purpose is well known and publicly available. When machine reading a MICR line, a bank runs a checksum test on the routing number using this algorithm.

Figure 2:
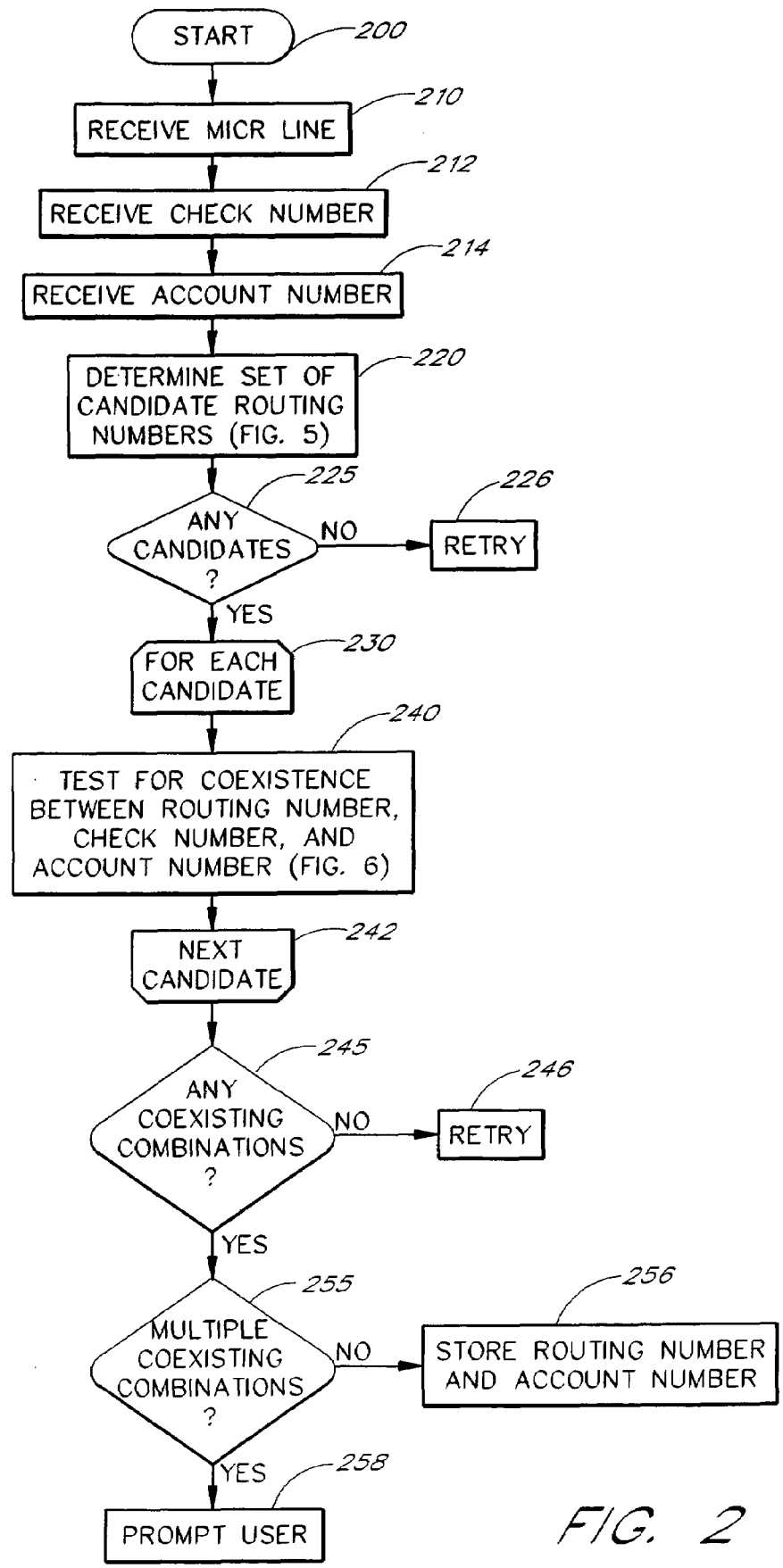
FIG. 2 illustrates the process used to extract bank routing and account numbers for the bank account of a seller.
Figure 5:
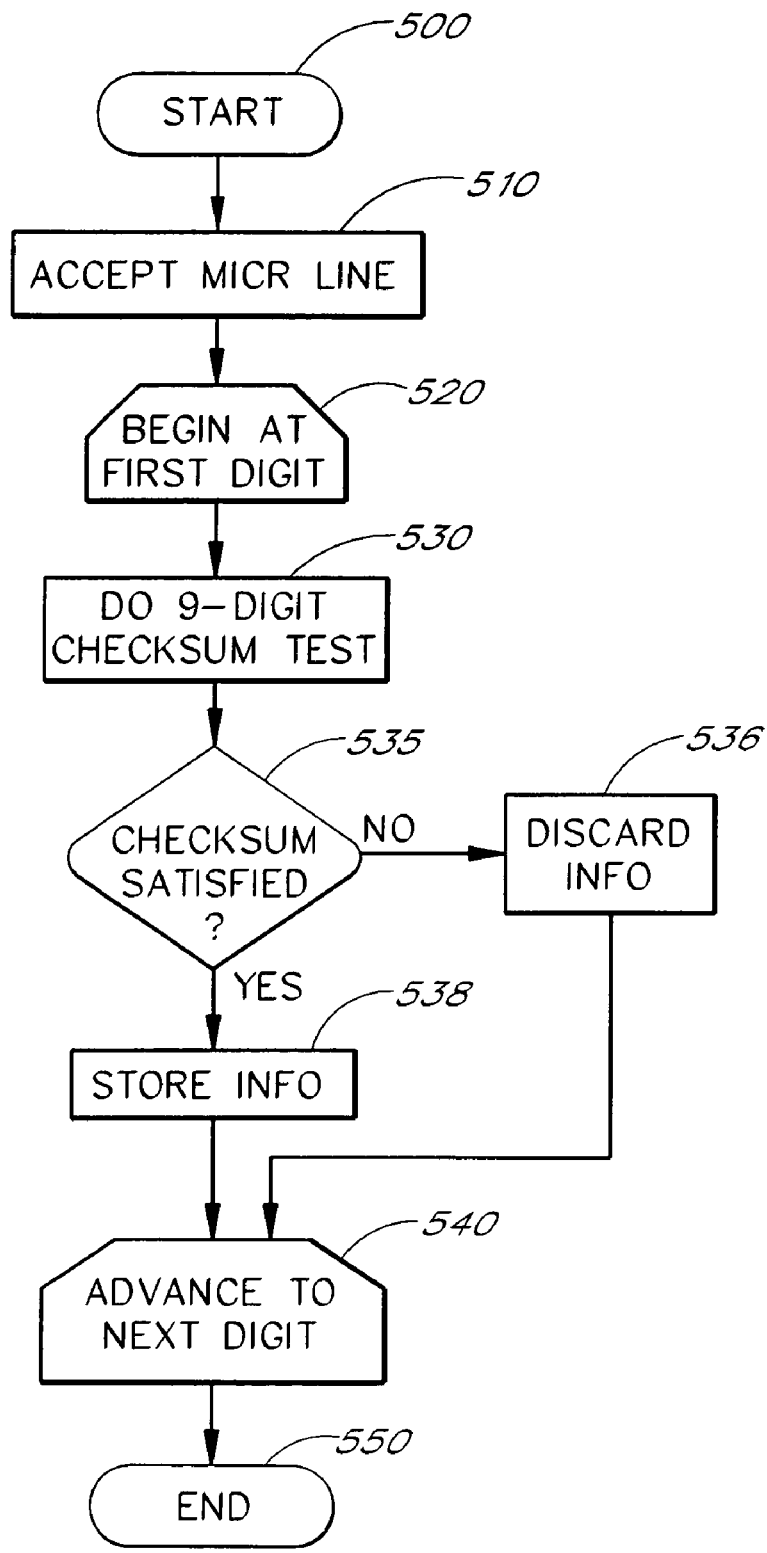
FIG. 5 illustrates the process used to determine a set of candidate routing numbers for use in the process of FIG. 2.

Referring to FIG. 2, the set of candidate routing numbers in state 220 may be determined in several ways. One preferred embodiment for determining this set is illustrated in FIG. 5. From a starting state 510, the program 180 proceeds to state 520, where the first digit of the MICR line is defined as the starting digit of a nine-digit checksum test. Proceeding to state 530, the nine-digit checksum test is performed on the nine contiguous digits of the MICR line starting with the first digit. Proceeding to state 540, execution is redirected depending upon the result of the checksum test. If the nine-digit string failed the checksum test (i.e., the checksum digits did not correspond to the message digits), the information is discarded in state 536. The program then proceeds to state 540, where the starting digit shifts one digit to the right (i.e., from the first digit to the second digit of the MICR line). The program then returns to state 520 to complete another nine-digit checksum test with the newly defined starting digit.

If, on the other hand, the checksum test was satisfied in state 535, the MICR line is stored in state 538 together with an indication that the checksum test was satisfied for that particular nine-digit string. The program then proceeds to state 540. When shifting the starting digit one to the right in state 540 leaves only an eight-digit string available for examination (i.e., the right end of the nine-digit "window" has shifted past the right end of the MICR line), the program proceeds to ending state 550.

Table I illustrates a full series of nine-digit checksum tests applied to a twenty-two digit MICR line. The process of FIG. 5 was repeated fourteen times—once for each nine-digit contiguous string within the MICR line. Inspection of Table I reveals that three of the fourteen nine-digit strings passed the checksum test, providing three candidate routing numbers for the banking institution that issued the check associated with this MICR line.

TABLE I

| Assessed Nine-Digit String (Bracketed) | Pass Checksum? | Candidate Routing Number |
|---|---|---|
| [314159265] 3589793238462 | No | — |
| 3 [141592653] 589793238462 | No | — |
| 31 [415926535] 89793238462 | No | — |
| 314 [159265358] 9793238462 | Yes | 159265358 |
| 3141 [592653589] 793238462 | No | — |
| 31415 [926535897] 93238462 | No | — |
| 314159 [265358979] 3238462 | No | — |
| 3141592 [653589793] 238462 | No | — |
| 31415926 [535897932] 38462 | No | — |
| 314159265 [358979323] 8462 | No | — |
| 3141592653 [589793238] 462 | Yes | 589793238 |
| 31415926535 [897932384] 62 | No | — |
| 314159265358 [979323846] 2 | Yes | 979323846 |
| 3141592653589 [793238462] | No | — |

As suggested by Table I, the vast majority of nine-digit strings generally fail the checksum test. Ideally, state 220 will find a single string that passes the checksum test—the one corresponding to the actual bank routing number. However, if the user entered the MICR line incorrectly in state 210, no valid strings may be found. Conversely, through a fortuitous combination of digits, two or more strings may be found to pass the checksum test within a given MICR line. This is the situation presented in Table I.

In one embodiment, illustrated in FIG. 4, if the process of FIG. 5 generates a single candidate routing number, the name of the banking institution 410 associated with that routing number is displayed to the user for verification. The bank name is determined from the routing number database 182.

The candidate routing numbers generated from the process of FIG. 5 may optionally be further filtered by comparison with the routing number database 182, which includes routing information on banking institutions. If the candidate routing number does not exist in the routing number database 182 it is eliminated as a candidate. This filtering may occur either within or subsequent to the process illustrated in FIG. 5.

Referring back to the process of FIG. 2, after the attempt in state 220 to determine a set of candidate routing numbers, the program is redirected by state 225 depending upon the results of the checksum test. If there are no candidate routing numbers, the program is redirected to a first "retry" state 226. In the first retry state 226, a decision is made whether or not the user should try to reenter one or more of the three numbers received in states 210, 212, and 214. If it is decided that the user should try again, an appropriate message is sent to the user prompting him to reenter information and the process begins anew at state 410. In one embodiment, the decision whether or not to try again depends upon whether the lack of candidate routing numbers in state 220 came after a first attempt to enter information in states 210, 212, and 214, or after a second or third attempt. In another embodiment, the decision whether or not to try again is left up to the user, who is prompted to indicate one choice or the other.

If it is decided in the first retry state 226 that the user should not try again, the user is prompted to use other means, for example a person-to-person telephone call, to transmit the bank account information. If at least one candidate string was found in state 220, state 225 directs the program to state 230.

Figure 6:
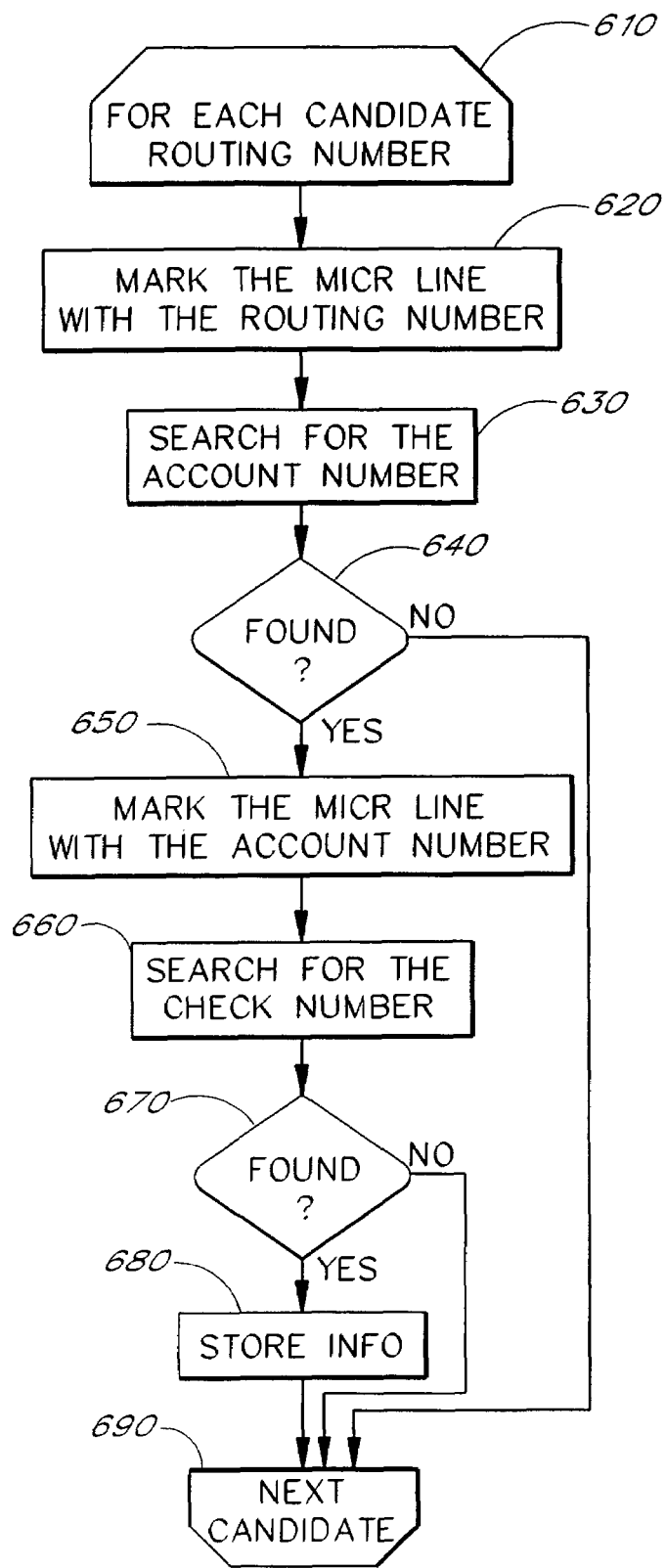
FIG. 6 illustrates the process used to test for coexistence between routing, check, and account numbers for use in the process of FIG. 2.

In state 230, a first candidate routing number is selected. Proceeding to state 240, the first candidate routing number is tested to see whether the candidate, the check number entered in state 212 and the account number entered in state 214 can all coexist within the MICR line entered in state 210. A process for testing for this coexistence is illustrated in FIG. 6.

Beginning in a starting state 610, the program proceeds to a first marking state 620, where the MICR line is "marked" with the candidate routing number. The act of "marking" the MICR line refers to blocking out the relevant digits of the MICR line associated with the marked number. Table II illustrates the MICR line from Table I marked with the three candidate routing numbers. The "R's" represent marked out digits within a candidate routing number.

TABLE II

| Full MICR Lines | Marked with Routing Numbers |
|---|---|
| 314 [159265358] 9793238462 | 314RRRRRRRRR9793238462 |
| 3141592653 [589793238] 462 | 3141592653RRRRRRRRR462 |
| 314159265358 [979323846] 2 | 314159265358RRRRRRRRR2 |

Proceeding to state 630, the marked MICR line resulting from state 620 is examined to see whether the account number entered in state 214 (i.e., the appropriate string of contiguous digits) is present. Proceeding to state 640, the program is redirected depending upon the results of the search in state 630. If the account number was not found in state 630, the program is redirected to ending state 690. This redirection indicates that the associated candidate routing number is no longer a candidate. Ending state 690 returns the program to state 242, where it is determined whether there are any candidate routing numbers remaining. If candidate routing numbers remain, the program is returned to state 230, where the process is repeated with a new candidate.

If the account number was found in state 630, the program proceeds to a second marking state 650, where the MICR line is marked with the account number identified in state 630. Consider, for example, the three marked MICR lines depicted in Table II. Consider further that the account number entered in state 214 was "3141592653." After passing through states 610-650, the first candidate routing number will be rejected as a candidate in state 640 (the ten-digit account number is not found within the singly-marked MICR line). The latter two candidates, on the other hand, will survive to become "doubly" marked. These results are illustrated in Table III. The "A's" represent marked out digits associated with the account number entered in state 214.

TABLE III

| Singly-marked MICR Lines | MICR Testing - Account Number |
|---|---|
| 314RRRRRRRRR9793238462 | Test failed |
| 3141592653RRRRRRRRR462 | AAAAAAAAAARRRRRRRRR462 |
| 314159265358RRRRRRRRR2 | AAAAAAAAAA58RRRRRRRRR2 |

Proceeding to state 660, the doubly-marked MICR line resulting from state 650 is examined to see whether the check number entered in state 212 (i.e., the appropriate string of contiguous digits) is present. Proceeding to state 670, the program is redirected depending upon the results of the search in state 660. If the check number was not found in state 660, the program is redirected to ending state 690. This redirection indicates that the associated candidate routing number is no longer a candidate. As noted above, ending state 690 returns the program to state 242, where it is determined whether there are any candidate routing numbers remaining.

If the check number was found in state 660, the program proceeds to a storing state 670, where the MICR line is stored together with the associated candidate routing number, account number identified in state 630, and check number identified in state 660. Consider, for example, the two doubly-marked MICR lines depicted in Table III. Consider further that the check number entered in state 212 was "462." After passing through states 660-690, the first surviving candidate routing number will be stored in state 680, together with the account number and check number. The second candidate, on the other hand, will be rejected in state 670 (the three-digit check number is not found within the doubly-marked MICR line). These results are illustrated in Table IV. The "C's" represent the digits associated with the check number entered in state 212.

TABLE IV

| Doubly-Marked MICR Lines | MICR Testing - Check Number |
|---|---|
| AAAAAAAAAARRRRRRRRR462 | AAAAAAAAAARRRRRRRRRCCC |
| AAAAAAAAAA58RRRRRRRRR2 | Test failed |

The process of FIG. 6 presents one preferred embodiment for testing for coexistence between a candidate routing number, an account number, a check number, and a MICR line. In an analogous embodiment, the check number may be searched for in the singly-marked MICR line, and the account number may be searched for in the doubly-marked MICR line.

In the process of FIG. 2, the set of candidate routing numbers is determined (in state 220) prior to, and independently of, the test for coexistence between the routing number, the check number, and the account number (state 240). Determination of the candidate routing numbers and marking with the account and check numbers can take place in any order. Two such alternative embodiments are illustrated in Tables V and VI.

In the embodiment of Table V, the MICR line is marked with the check number and the account number before checksum testing is carried out on the resulting doubly-marked MICR line. In the embodiment of Table VI, the MICR line is first marked with the check number, then checksum testing is carried out, and finally coexistence with the account number is verified. Other permutations of marking and checksum testing are possible as well.

TABLE V

| Action | Result |
|---|---|
| Load MICR line | 3141592653589793238462 |
| Mark MICR line with Account No. | AAAAAAAAAA589793238462 |
| Mark marked MICR line with Check No. | AAAAAAAAAA589793238CCC |
| Do 9-digit checksum test on doubly-marked MICR line | 589793238 passes the checksum test |

TABLE VI

| Action | Result |
|---|---|
| Load MICR line | 3141592653589793238462 |
| Mark MICR line with Check No. | 3141592653589793238CCC |
| Do 9-digit checksum on the singly-marked MICR line | Two candidate Routing Nos. pass: A: 314 [159265358] 9793238CCC B: 3141592653 [589793238] CCC |
| Search for Account No. (=3141592653) in the doubly-marked MICR line | Candidate A: Fails the search 314RRRRRRRRR9793238CCC Candidate B: Passes the search 3141592653]RRRRRRRRRCCC |

Referring back to the process of FIG. 2, after the test for coexistence has been applied to each candidate routing number (states 230-242), the program proceeds to state 245, where the program is redirected depending upon the results of the coexistence analysis. If there are no candidate routing numbers that result in coexisting numbers, the program is redirected to a second retry state 246.

Figure 7:
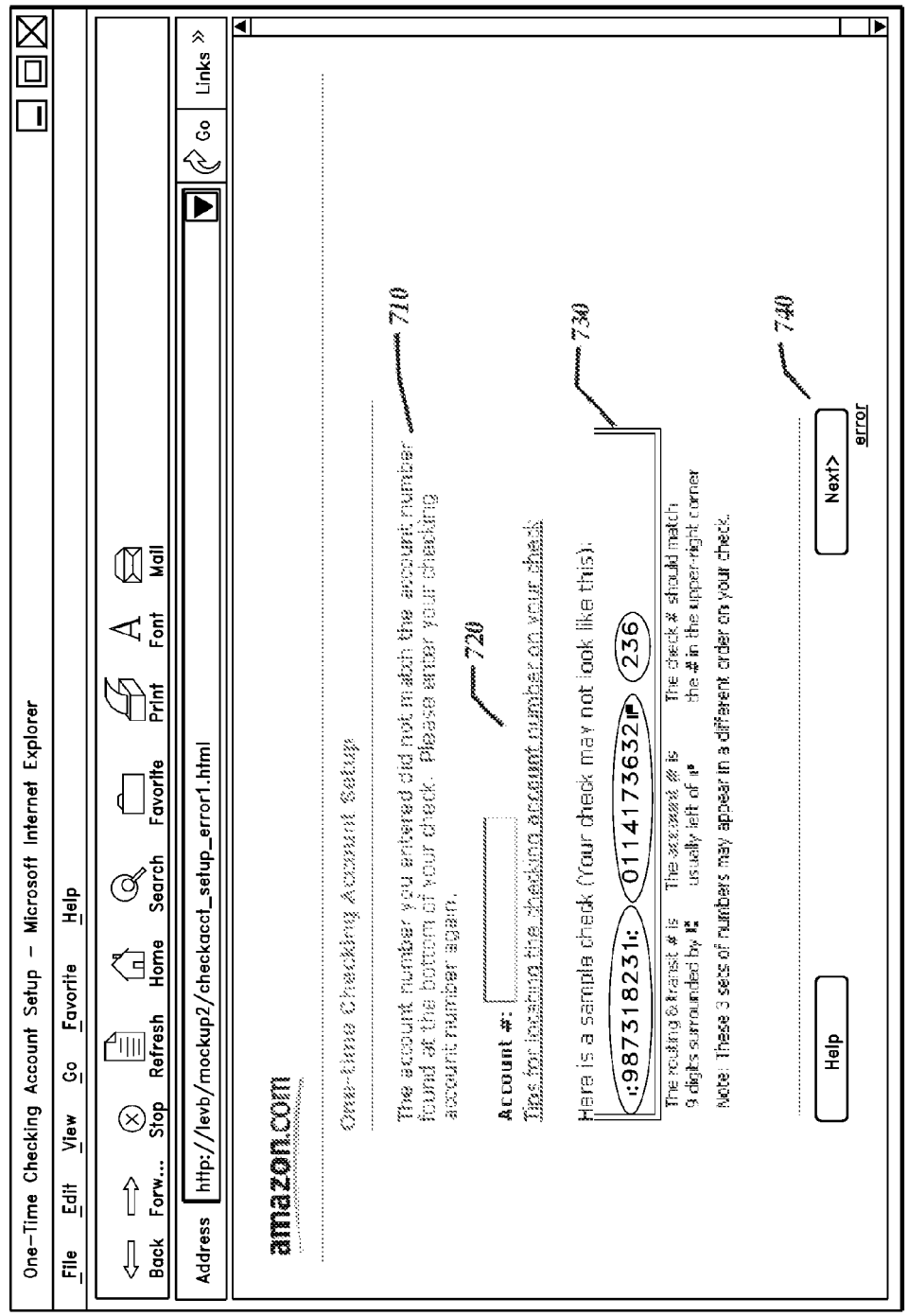
FIG. 7 illustrates the first of two sample error message pages informing the seller that the entered account number is incompatible with the entered MICR line.
Figure 8:
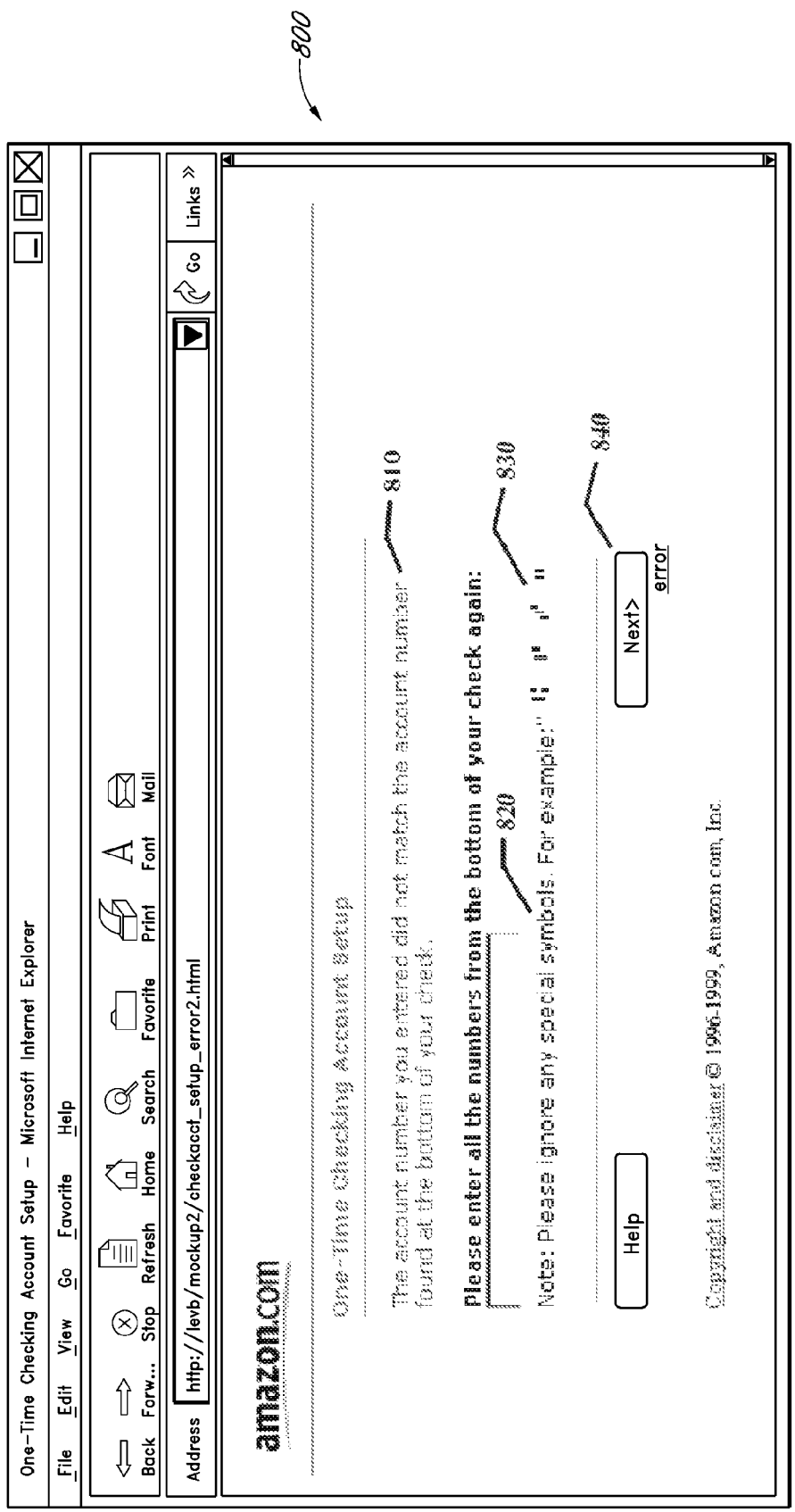
FIG. 8 illustrates the second of two sample error message pages informing the seller that the entered account number is incompatible with the entered MICR line.
Figure 9:
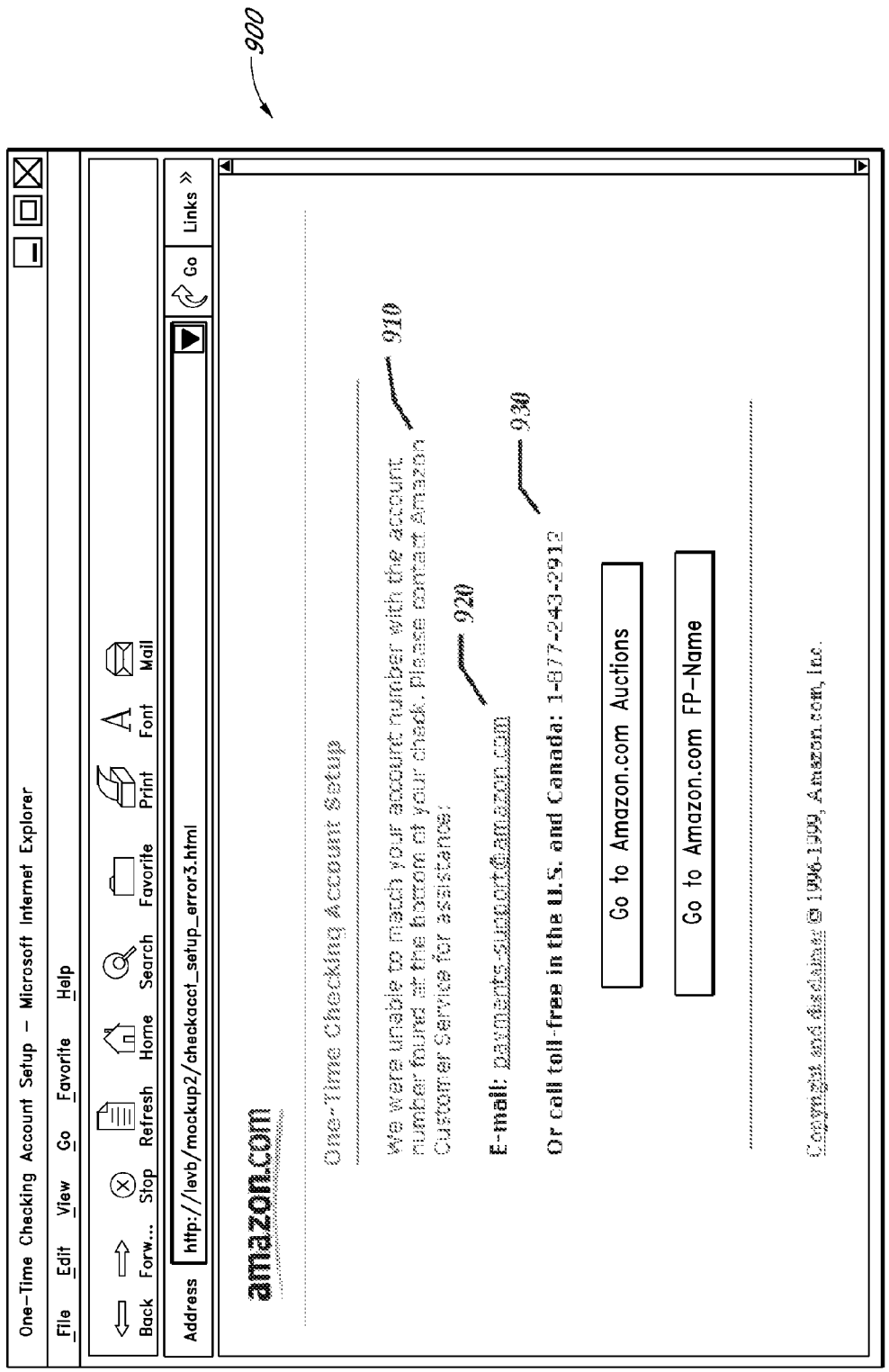
FIG. 9 illustrates a sample error message page requesting that the seller contact the web site operator for assistance.

As with the first retry state 226, discussed above, a decision is made in the second retry state 246 whether or not the user should try to reenter one or more of the three numbers received in states 210, 212, and 214. In one embodiment, the decision whether or not to try again depends upon whether the lack of candidate routing numbers in state 220 came after a first attempt to enter information in states 210, 212, and 214, or after a second or third attempt. FIGS. 7, 8, and 9 illustrate sample web pages that guide a user through one preferred embodiment of the second retry state.

FIG. 7 illustrates a first null result web page 700 presented to the user after the program was (eventually) redirected to state 246 following a null search result for the account number within the singly-marked MICR line (state 630). In one embodiment, the web page 700 is generated only if the user has thus far only entered the account number once before (in state 214). The first null result web page 700 includes a prompt 710 requesting reentry of the account number on the bank check, together with a field 720 in which to enter the digit string. The web page 700 further includes pictures and text 730 to assist the user in identifying the account number within the MICR line, and a Next button 740 that transmits the newly entered account number and directs the user to a new web page.

FIG. 8 illustrates a second null result web page 800 presented to the user after the program was (eventually) redirected to state 246 following a null search result for the account number within the singly-marked MICR line (state 630). In one embodiment, the web page 800 is generated only if the user has made two attempts to enter the account number: once in state 214, and again in response to the first null result web page 700. The second null result web page 800 includes a prompt 810 requesting reentry of the entire MICR line from the bank check, together with a field 820 in which to enter the digit string. The web page 800 further includes pictures and text 830 to assist the user in identifying the MICR line, and a Next button 840 that transmits the newly entered MICR line and directs the user to a new web page.

FIG. 9 illustrates a third null result web page 900 presented to the user after the program was (eventually) redirected to state 246 following a null search result for the account number within the singly-marked MICR line (state 630). In one embodiment, the web page 900 is generated only if the user has made three attempts to enter the account number: once in state 214, again in response to the first null result web page 700, and yet again in response to the second null result web page 800. The third null result web page 900 includes a message 810 informing the user of the problem, and presenting alternative means of contacting the host web site 140 to convey the needed information. In one embodiment, the alternative means include sending an electronic mail message 920 and placing a person-to-person telephone call 930.

Referring back to the process of FIG. 2, if there is at least one coexisting set of numbers satisfying the test in state 240, state 245 redirects the program to state 255. In state 255, the program is redirected depending upon the number of candidate routing numbers satisfying the coexistence analysis of state 240. If there is more than one such routing number, the user is prompted in state 258 to remove the ambiguity.

In one embodiment, the prompt in state 258 consists of presenting the user with a banking institution name for each candidate routing number, the bank name being determined from the routing numbers database 182 for the associated routing number. The user may then select the appropriate banking institution from the list provided. Alternatively, the user may be prompted to enter the name of the bank, and the entered information may then be compared to the multiple bank names to select the routing number.

In another embodiment, the prompt 258 consists of a message requesting that the user use alternative means to convey the needed information, similar to the messages 910, 920, 930 displayed in the third null result web page 900.

If there is only one coexisting set of numbers satisfying the test in state 240, state 245 directs the program to state 256. In state 256, the sole surviving candidate routing number is stored, together with the account number, in the user bank account database 184. The bank information is stored together with an identifier for the user, thus allowing the host web site to associate each user who has registered for Amazon.com Payments with his or her proper banking institution and proper checking account within that institution.

In one embodiment, the coexistence testing (in state 240) is not implemented. Instead, the routing candidates from the checksum testing (in state 220) are treated in state 245 in the manner described above for the coexisting combinations.

As noted above, sellers who advertise and sell products via online auctions or online flea markets typically do not have a preexisting relationship with those who purchase their products. As such, a seller generally will not ship the purchased product until he or she has received payment in full. The embodiments for extracting information from a check discussed above can greatly speed up this process. Once the host web site 140 has stored the bank routing number and bank account number for a particular seller in the user bank account database 184, that user immediately receives payment for any goods sold via the host web site 140, without any need for the buyer and seller to contact one another. Further, in the preferred embodiment, buyers that use the 1-Click service can purchase an item from the seller with a single mouse click or other single action. The manner in which a transaction may be carried out using a seller's stored bank routing number and bank account number will now be provided with the help of FIGS. 10, 11, and 12.

Figure 10:
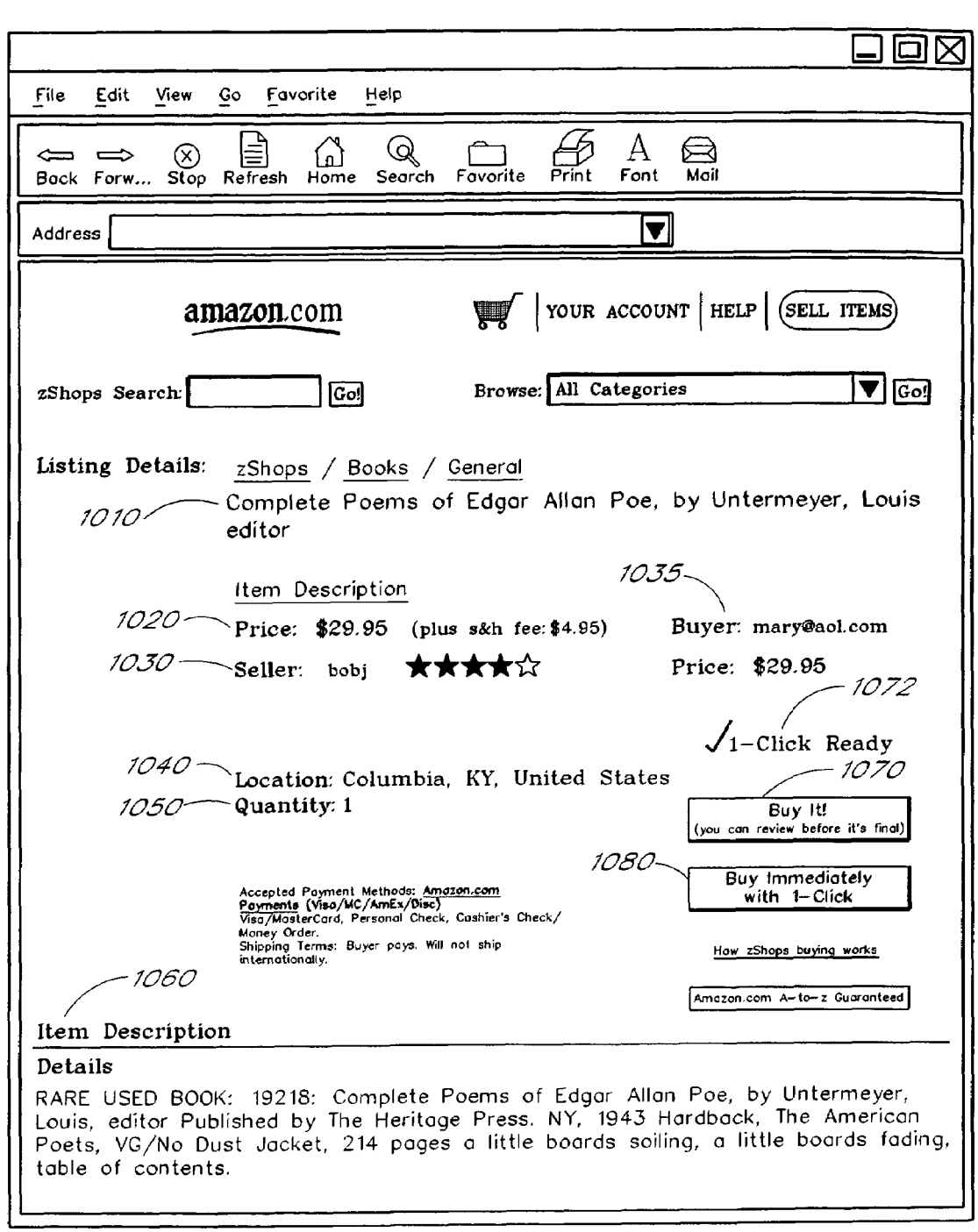
FIG. 10 illustrates a sample purchase page of the host web site. The described product is associated with a third party seller.

FIG. 10 illustrates a sample purchase page 1000 within the fixed-price sales section of the host web site 140. A product advertised on the purchase page 1000 is associated with a third party seller, "BobJ," who has previously registered to use the Amazon.com Payments service. The purchase page 1000 advertises a book for sale by BobJ at a fixed price. The page 1000 includes a title for the book 1010, a purchase price 1020, a seller-identifier 1030, a buyer-identifier 1035, a location-identifier 1040 for the seller, a quantity indicator 1050 regarding the number of book copies available, and a description 1060 of the book. In one embodiment, one or both of the seller- and buyer-identifiers is given by an electronic mail account identifier. In another embodiment, all identifiers are aliases.

The purchase page 1000 further includes a purchase button 1070 that buyers may select to purchase the advertised book. A "1-Click Ready" message 1072 informs the buyer that the seller accepts Amazon.Com Payments. This informs the buyer that the seller will be compensated immediately for the transaction once it is finalized by the buyer, thus avoiding the delay that occurs when a seller waits for a check in the mail. If the buyer has enabled the 1-Click service, the page may optionally include a button, link, or other control 1080 for buying the item with a single action.

FIG. 11 illustrates a sample listing page 1100 within the fixed-price sales section of the host web site 140. The listing page 1100 includes a list of products for sale by third party sellers. Each product has an associated hypertext link to a product purchase page like the one illustrated in FIG. 10. The listing page 1100 includes an 1-Click Payment indicator 1110 for each product that informs prospective buyers whether the seller associated with the product is registered with Amazon.com Payments. As noted above, this informs the buyer that the seller will be compensated immediately for the transaction once it is finalized. In one embodiment, the listing page 1100 also provides a hypertext link (not shown) that provides the buyer with a "filtered" listing page containing only those products that are 1-Click Payment enabled.

Figure 12:
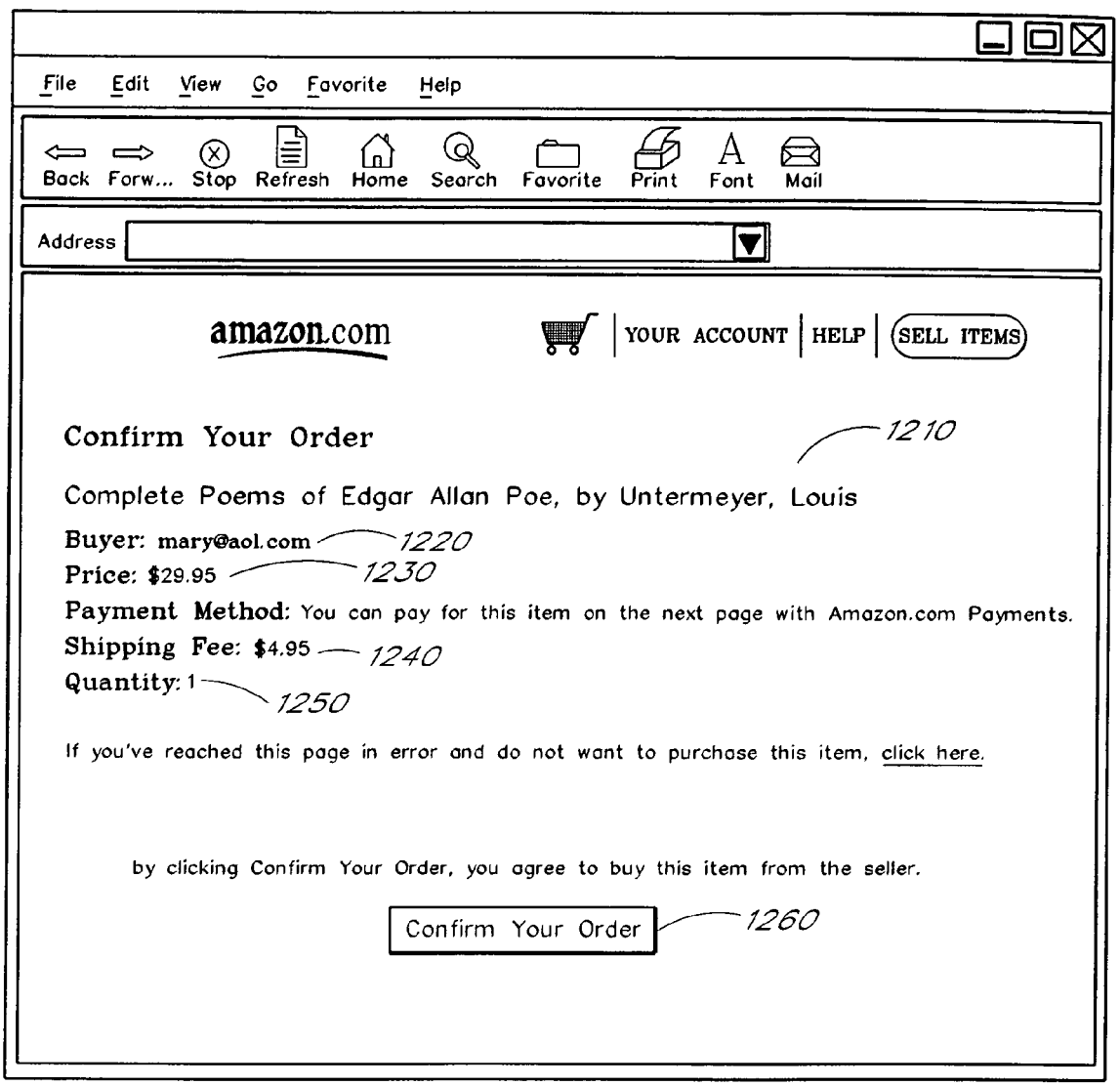
FIG. 12 illustrates a sample order confirmation page displayed when a prospective buyer selects a purchase option on the purchase page shown in FIG. 10.

FIG. 12 illustrates a sample order confirmation page 1200 displayed when the buyer selects the purchase button 1070 on the purchase page 1000. The display of the confirmation page 1200 may optionally be omitted if 1-Click purchasing is used. The confirmation page 1200 repeats the book title 1210, the buyer-identifier 1220, and purchase price 1230, and displays a shipping fee 1240 and a quantity of books ordered 1250. The order confirmation page further includes a confirmation button 1260 that buyers may select to confirm their purchase of the advertised book.

Upon selection of the confirmation button 1260, the buyer is provided with another web page in which the buyer can enter a credit card number, or select a previously-stored credit card number. Once the buyer's credit card information has been received, the web site 140 charges the buyer the full transaction cost and sends the appropriate payment (purchase price less any transaction fees) to the bank account of the seller. The seller's account receives credit for the payment within five days. In one embodiment, the host web site 140 also immediately sends the buyer's mailing address to the seller, for example, by sending the transaction information (product description, purchase price, buyer's address) in an automated electronic mail message to the seller's electronic mail account. In one embodiment, the mailing address communicated to the seller is taken from the buyer's 1-Click settings.

In another embodiment, upon winning an auction or buying a fixed-price item, an email is sent to the buyer with a link to an Amazon.com Payments web page. If the buyer has enabled the 1-Click service, this page includes a button for paying immediately with the buyer's 1-Click settings; otherwise, the user is prompted to specify payment and shipping information.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

In the claims, which follow, reference characters used to denote process acts are provided for convenience of description only, and not to imply a particular order for performing the acts.

What is claimed is:

1. A computer-implemented method of assisting the transfer of funds between a buyer and a seller, comprising:
   (a) prompting the seller to enter information, by an interface in communication with one or more processors, from a face of a check associated with a bank account of the seller, through manual input, the information comprising at least a first character string corresponding to a Magnetic Ink Character Recognition (MICR) line on the check, a second character string corresponding to a bank account number associated with the check, and a third character string corresponding to a check number associated with the check;
   (b) creating, by the one or more processors, a doubly-marked MICR line from the first character string by identifying and marking out (1) a first portion of the first character string that corresponds to the second character string, and (2) a second portion of the first character string that corresponds to the third character string;
   (c) determining, by the one or more processors, a routing number for the check by identifying within the doubly-marked MICR line a contiguous string of characters that satisfies a checksum test;
   (d) causing a credit card of the buyer to be charged to collect funds for one or more items purchased by the buyer from the seller; and
   (e) depositing at least a portion of the funds into the bank account of the seller using the routing determined in (c).

2. The method of claim 1, further comprising, in response to successful completion of (c), displaying, in association with an item posted for sale by the seller, an indication that the seller is enabled to accept payment electronically.

3. The method as in claim 1, wherein the prompting the seller to enter information includes displaying to the user a generalized image of a check with indicators of the locations of the MICR line, check number, and account number.

4. The method as in claim 2, wherein displaying an indication comprises presenting the buyer an option to purchase the item using a default credit card number previously specified by the buyer.

5. The method of claim 1, further comprising sending the seller mailing address information previously specified by the buyer.

6. The method as in claim 1, wherein determining a routing number further comprises by the one or more processors to compare the contiguous string that satisfies the checksum test with a database of valid bank routing numbers.

7. A computer-implemented method of assisting the transfer of funds from a buyer to a bank account of a seller, the method comprising:
   (a) receiving, through an interface in communication with one or more processors, a character string specified by a user through manual input, said character string corresponding to a Magnetic Ink Character Recognition (MICR) line displayed on a check associated with the seller's account;
   (b) receiving from the user, via the interface, a first string of digits corresponding to a bank account number associated with the seller's account;
   (c) receiving from the user, via the interface, a second string of digits corresponding to a check number associated with the check;
   (d) creating, by the one or more processors, a singly-marked MICR line by identifying and marking out a portion of the MICR line that corresponds to either the first string of digits or the second string of digits;
   (e) testing, by the one or more processors, each of a plurality of strings of contiguous digits within the singly-marked MICR line for compliance with a checksum test associated with routing numbers to identify one or more candidate routing numbers;
   (f) creating, by the one or more processors, a set of one or more candidate doubly-marked MICR lines, the candidate doubly-marked MICR lines generated by identifying and marking out a portion of the singly-marked MICR line corresponding to each of the one or more candidate routing numbers identified in (e);
   (g) identifying, by the one or more processors, within the set of candidate doubly-marked MICR lines, a doubly-marked MICR line that includes whichever of the first and second strings of digits was not used in (d) to create the singly-marked MICR line;
   (h) storing the candidate routing number associated with the doubly-marked MICR line identified in (g); and
   (i) causing funds to be deposited into the bank account of the seller using the routing number determined in (h).

8. The method of claim 7, further comprising:
   in response to the successful extraction from the MICR line of a bank routing number for the seller's account, displaying, in conjunction with an item posted for sale by the seller, indicia that the seller accepts electronic payments through a third party payment service.

9. The method of claim 7, further comprising:
prompting the user, via the interface, to submit the character string corresponding to the MICR line from a check of the account holder.

10. The method of claim 9, further comprising:
using the interface to provide the user with an image of a check with an indication of the location of the MICR line on the check, to assist the user in identifying the character string associated with the MICR line.

11. The method of claim 7, further comprising prompting the user, via the interface, to submit a check number from a check of the account holder.

12. The method of claim 11, further comprising:
using the interface to provide the user with an image of a check with an indication of the location of the check number on the check, to assist the user in identifying the string of digits associated with the check number.

13. The method of claim 7, further comprising:
using the interface to provide the user with an image of a check with an indication of the location of the account number on the check, to assist the user in identifying the string of digits associated with the account number.

14. The method of claim 7, further comprising:
storing the string of digits associated with the account number.

15. The method of claim 7, further comprising:
prompting the user, via the interface, to submit a bank name corresponding to a banking entity that issued the check of the account holder;
receiving from the user, via the interface, in response to said prompting a bank name corresponding to the banking entity; and
using the one or more processors to determine, from a database of bank institution routing numbers, a bank routing number associated with the bank name received from the user that corresponds to the contiguous string of digits that satisfies the checksum test.

16. The method of claim 7, further comprising:
comparing, by the one or more processors the string of contiguous digits that satisfies the checksum test to a database of valid bank routing numbers having associated bank names.

17. The method of claim 16, further comprising:
using the interface to provide the user with a bank name determined to be associated with the candidate bank routing number; and
receiving from the user, via the interface, a selection verifying the validity of the bank name provided to the user.

18. The method of claim 16, further comprising:
using the comparison of the string of contiguous digits that satisfies the checksum test with the database of bank routing numbers to assist in extracting the routing number from the MICR line.

19. The method of claim 7 wherein the checksum test is applied to a contiguous string of nine digits within the MICR line.

20. A computer system comprising:
one or more processors, said one or more processors programmed to perform a method of assisting the transfer of funds from a buyer to a bank account of a seller, the method comprising:
(a) receiving a character string specified by a user through manual input, said character string corresponding to a Magnetic Ink Character Recognition (MICR) line displayed on a check associated with the seller's account;
(b) receiving from the user a first string of digits corresponding to a bank account number associated with the seller's account;
(c) receiving from the user a second string of digits corresponding to a check number associated with the check;
(d) creating, by one or more processors, a singly-marked MICR line by identifying and marking out a portion of the MICR line that corresponds to either the first string of digits or the second string of digits;
(e) testing, by the one or more processors, each of a plurality of strings of contiguous digits within the singly-marked MICR line for compliance with a checksum test associated with routing numbers to identify one or more candidate routing numbers;
(f) creating, by the one or more processors, a set of one or more candidate doubly-marked MICR lines, the candidate doubly-marked MICR lines generated by identifying and marking out a portion of the singly-marked MICR line corresponding to each of the one or more candidate routing numbers identified in (e);
(g) identifying, by the one or more processors, within the set of candidate doubly-marked MICR lines, a doubly-marked MICR line that includes whichever of the first and second strings of digits was not used in (d) to create the singly-marked MICR line;
(h) storing the candidate routing number associated with the doubly-marked MICR line identified in (g); and
(i) depositing funds into the bank account of the seller using the routing number determined in (h).

21. A computer-readable medium having computer readable instructions stored thereon for execution by a processor to perform a method of assisting the transfer of funds from a buyer to a bank account of a seller, the method comprising:
(a) receiving a character string specified by a user through manual input, said character string corresponding to a Magnetic Ink Character Recognition (MICR) line displayed on a check associated with the seller's account;
(b) receiving from the user a first string of digits corresponding to a bank account number associated with the seller's account;
(c) receiving from the user a second string of digits corresponding to a check number associated with the check;
(d) creating, by one or more processors, a singly-marked MICR line by identifying and marking out a portion of the MICR line that corresponds to either the first string of digits or the second string of digits;
(e) testing, by the one or more processors, each of a plurality of strings of contiguous digits within the singly-marked MICR line for compliance with a checksum test associated with routing numbers to identify one or more candidate routing numbers;
(f) creating, by the one or more processors, a set of one or more candidate doubly-marked MICR lines, the candidate doubly-marked MICR lines generated by identifying and marking out a portion of the singly-marked MICR line corresponding to each of the one or more candidate routing numbers identified in (e);
(g) identifying, by the one or more processors, within the set of candidate doubly-marked MICR lines, a doubly-marked MICR line that includes whichever of the first and second strings of digits was not used in (d) to create the singly-marked MICR line;

(h) storing the candidate routing number associated with the doubly-marked MICR line identified in (g); and (i) causing funds to be deposited into the bank account of the seller using the routing number determined in (h).

22. A computer-implemented method of acquiring a routing number for a bank account from the information displayed on a check of the account holder, the method comprising:

(a) receiving, using an interface in communication with one or more processors, through manual input, a character string specified by a user, said character string corresponding to a Magnetic Ink Character Recognition (MICR) line displayed on a check associated with the account;

(b) receiving, via the interface, an account number specified by the user, said account number corresponding to a string of digits within the MICR line;

(c) receiving, via the interface, a check number specified by the user, said check number corresponding to a string of digits within the MICR line;

(d) creating, by the one or more processors, a doubly-marked MICR line by identifying and marking out (1) a first portion of the MICR line that corresponds to the account number specified by the user, and (2) a second portion of the MICR line that corresponds to the check number specified by the user;

(e) testing, by the one or more processors, one or more contiguous strings of digits within the doubly-marked MICR line in order to identify a string of digits that satisfies a checksum test; and (f) storing the contiguous string that satisfies the checksum test of (e) for use as a routing number.

23. The method of claim 22, further comprising:

(g) in response to the storing of the contiguous string in (f), displaying in conjunction with an item posted for sale by the user indicia that the user accepts electronic payments through a third party payment service.

24. The method of claim 22, further comprising:

(g) storing the account number received in (b).

25. The method of claim 22 wherein the checksum test is applied to a contiguous string of nine digits within the MICR line.

26. A computer system comprising:

one or more computers, said one or more computers programmed to perform a method of acquiring a routing number for an account holder from the information displayed on a check of the account holder, the method comprising:

(a) receiving, via an interface in communication with the one or more computers, through manual input, a character string specified by a user, said character string corresponding to a Magnetic Ink Character Recognition (MICR) line displayed on a check associated with the account;

(b) receiving, via the interface, an account number specified by the user, said account number corresponding to a string of digits within the MICR line;

(c) receiving, via the interface, a check number specified by the user, said check number corresponding to a string of digits within the MICR line;

(d) creating, by the one or more programmed computers, a doubly-marked MICR line by identifying and marking out (1) a first portion of the MICR line that corresponds to the account number specified by the user, and (2) a second portion of the MICR line that corresponds to the check number specified by the user;

(e) testing, by the one or more programmed computers, one or more contiguous strings of digits within the doubly-marked MICR line in order to identify a string of digits that satisfies a checksum test; and (f) storing the contiguous string that satisfies the checksum test of (e) for use as a routing number.

27. A computer-readable medium having computer readable instructions stored thereon for execution by a processor to perform a method of acquiring a routing number for an account holder from the information displayed on a check of the account holder, the method comprising:

(a) receiving, through manual input, a character string specified by a user, said character string corresponding to a Magnetic Ink Character Recognition (MICR) line displayed on a check associated with the account;

(b) receiving an account number specified by the user, said account number corresponding to a string of digits within the MICR line;

(c) receiving a check number specified by the user, said check number corresponding to a string of digits within the MICR line;

(d) creating, by one or more processors, a doubly-marked MICR line by identifying and marking out (1) a first portion of the MICR line that corresponds to the account number specified by the user, and (2) a second portion of the MICR line that corresponds to the check number specified by the user;

(e) testing, by the one or more processors, one or more contiguous strings of digits within the doubly-marked MICR line in order to identify a string of digits that satisfies a checksum test; and (f) storing the contiguous string that satisfies the checksum test of (e) for use as a routing number.

28. A system for acquiring and using a bank routing number for a bank account holder from the information displayed on a check of the account holder, comprising:

one or more processors configured to provide a user interface that prompts for and receives a first character string corresponding to a Magnetic Ink Character Recognition (MICR) line submitted by a user through manual input, that further prompts for and receives a second character string corresponding to a bank account number submitted by the user, and that further prompts for and receives a third character string corresponding to a check number submitted by the user;

the one or more processors further configured to provide a check information extraction tool in communication with the user interface that receives the first, second and third character strings and that generates a fourth character string comprising a doubly-marked MICR line by identifying and marking out (1) a first portion of the first character string that corresponds to the second character string and (2) a second portion of the first character string that corresponds to the third character string, the check information extraction tool also testing one or more contiguous strings of digits within the doubly-marked MICR line character string in order to identify a contiguous string of digits that satisfies a checksum test, thereby extracting a user bank routing number from the MICR line character string; and the one or more processors further configured to provide an electronic fund transfer application configured to transfer funds into a bank account associated with the user.

29. The system of claim 28, further comprising:

a computer storage in communication with the check information extraction tool, where the computer storage may be used to store a user bank routing number extracted by the check information extraction tool.

30. The system of claim 28, where the user interface further includes a generalized image of a check with an indicator of the location within the check of the MICR line.

31. The system of claim 28, where the user interface further includes a generalized image of a check with an indicator of the location within the check of the check number.

32. The system of claim 28, where the user interface further includes a generalized image of a check with an indicator of the location within the check of the account number.

33. The system of claim 28, where the check information extraction tool further stores the account number in the computer storage.

34. The system of claim 28, further comprising a display of an item posted for sale by the user, where the display includes indicia that the user accepts electronic payments through a third party payment service.

35. The system of claim 28, further comprising a database of valid bank entity routing numbers in communication with the check information extraction tool, where the check information extraction tool utilizes the valid bank entity routing numbers within the database in extracting a user bank routing number from a character string.

* * * * *